(12) United States Patent
Bloom

(10) Patent No.: US 7,446,925 B2
(45) Date of Patent: Nov. 4, 2008

(54) MICRO-ELECTROMECHANICAL LIGHT MODULATOR WITH ANAMORPHIC OPTICS

(75) Inventor: David M. Bloom, Jackson, WY (US)

(73) Assignee: Alces Technology, Jackson, WY (US)

( * ) Notice: Subject to any disclaimer, the term of this patent is extended or adjusted under 35 U.S.C. 154(b) by 33 days.

(21) Appl. No.: 11/472,086

(22) Filed: Jun. 21, 2006

(65) Prior Publication Data

US 2006/0238851 A1    Oct. 26, 2006

Related U.S. Application Data

(63) Continuation-in-part of application No. 11/336,277, filed on Jan. 20, 2006, now Pat. No. 7,286,277, which is a continuation-in-part of application No. 11/161,452, filed on Aug. 3, 2005, now Pat. No. 7,277,216, which is a continuation-in-part of application No. 10/904,766, filed on Nov. 26, 2004, now Pat. No. 7,054,051.

(51) Int. Cl.
    *G02F 26/00* (2006.01)
(52) U.S. Cl. .................................... 359/279
(58) Field of Classification Search .............. 359/279, 359/280, 290, 291, 292, 293, 295, 298, 220, 359/223, 230, 231, 437, 495, 566, 572, 573, 359/583; 356/364, 365, 450, 487
    See application file for complete search history.

(56) References Cited

U.S. PATENT DOCUMENTS 4,710,732 A    12/1987  Hornbeck
4,758,092 A    7/1988   Heinrich
5,097,351 A    3/1992   Kramer
5,311,360 A    5/1994   Bloom
5,537,432 A *  7/1996   Mehuys et al. ........... 372/50.11
5,661,592 A    8/1997   Bornstein
5,691,836 A *  11/1997  Clark .......................... 359/247
5,841,489 A *  11/1998  Yoshida et al. ................. 349/17
5,936,764 A *  8/1999   Kobayashi ................... 359/385
5,982,553 A    11/1999  Bloom
5,982,555 A    11/1999  Melville
6,084,626 A    7/2000   Ramanujan
6,088,102 A    7/2000   Manhart
6,122,103 A    9/2000   Perkins
6,268,948 B1   7/2001   Gelbart
6,330,097 B1   12/2001  Chen
6,466,354 B1   10/2002  Gudeman
6,577,429 B1 * 6/2003   Kurtz et al. .................. 359/279
6,687,521 B2 * 2/2004   Sato et al. .................... 600/344
6,724,515 B1   4/2004   Kowarz
7,054,051 B1   5/2006   Bloom
7,075,055 B2 * 7/2006   Nagai .......................... 250/225
7,119,936 B2 * 10/2006  Kowarz et al. .............. 359/224
7,136,211 B2 * 11/2006  Huang et al. ................. 359/237
7,193,766 B2 * 3/2007   Bloom ........................ 359/279

* cited by examiner

*Primary Examiner*—Ricky L Mack
*Assistant Examiner*—Tuyen Q Tra
(74) *Attorney, Agent, or Firm*—Nupat, LLC; Morrison Ulman

(57) ABSTRACT

Micro-electromechanical light modulators are combined with anamorphic and contrast enhancing optical elements to form optical display engines. Linear MEMS arrays are suitable for the étendue of low divergence light sources while handling high optical power for brightness. The output of an optical engine is a line image which may be scanned to form a two-dimensional image.

16 Claims, 6 Drawing Sheets

MICRO-ELECTROMECHANICAL LIGHT MODULATOR WITH ANAMORPHIC OPTICS

RELATED APPLICATIONS

This application is a continuation-in-part of U.S. Ser. No. 11/336,277, filed on Jan. 20, 2006, which is a continuation-in-part of U.S. Ser. No. 11/161,452, filed on Aug. 3, 2005, which is a continuation-in-part of U.S. Ser. No. 10/904,766 (now U.S. Pat. No. 7,054,051), filed on Nov. 26, 2004, each of which is incorporated herein by reference.

TECHNICAL FIELD

The disclosure relates generally to visual display devices and light modulator systems. In particular it relates to imaging optics in micro-electromechanical light modulator systems.

BACKGROUND

Display systems manipulate light to form images of text, graphics and other visual scenes. Light propagation involves a complex variety of phenomena including wave properties and polarization. In related applications, U.S. Ser. Nos. 10/904,766, 11/161,452 and 11/336,277, a new class of display engines called "polarization light modulators" was introduced. Polarization light modulators comprise polarization interferometers combined with MEMS (micro-electromechanical systems) devices that shift the phase of optical waves.

A polarization light modulator display relies on interferometry to modulate pixels in a displayed image. Interferometry in turn depends on manipulating the phase of light to produce constructive or destructive interference.

In these new systems a linear array of MEMS optical phase shifting devices serves to modulate a line of pixels in a displayed image. A polarizing beam splitter acts as both the polarizer and the analyzer in an interferometer while a polarization displacement device divides polarized light from the polarizer into orthogonal polarization components. The MEMS optical phase shifting device array imparts a relative phase shift onto the polarization components and returns them to the polarization displacement device where they are recombined and sent to the analyzer. The MEMS optical phase shifting devices are electronically controlled and convert electronic image data (light modulation instructions) into actual light modulation.

In light modulators disclosed in U.S. Ser. Nos. 10/904,766 and 11/161,452, the direction of polarization displacement is parallel to ribbons or cantilevers in the MEMS optical phase shift device. This means that light forming a particular pixel comes from light that was reflected from different parts of a single ribbon or cantilever.

In light modulators disclosed in U.S. Ser. No. 11/336,277 orthogonal polarizations are displaced perpendicular to ribbons or cantilevers in a MEMS optical phase shift device. Accordingly, light forming a displayed pixel comes from light reflected from more than one ribbon or cantilever.

Independent of polarization and interferometric control, brightness and contrast are characteristics of displays that are in need of continual improvement. Part of the art of achieving high display brightness involves matching the optical characteristics of light sources and light modulators. As light sources with improved performance become available, light modulators and optical systems must be developed to take advantage of the improvements.

Displays require innovative optical schemes for illumination and imaging of ribbon-based MEMS light modulators to achieve maximum performance.

BRIEF DESCRIPTION OF THE DRAWINGS

The drawings are heuristic for clarity.

DETAILED DESCRIPTION

Figure 1A:
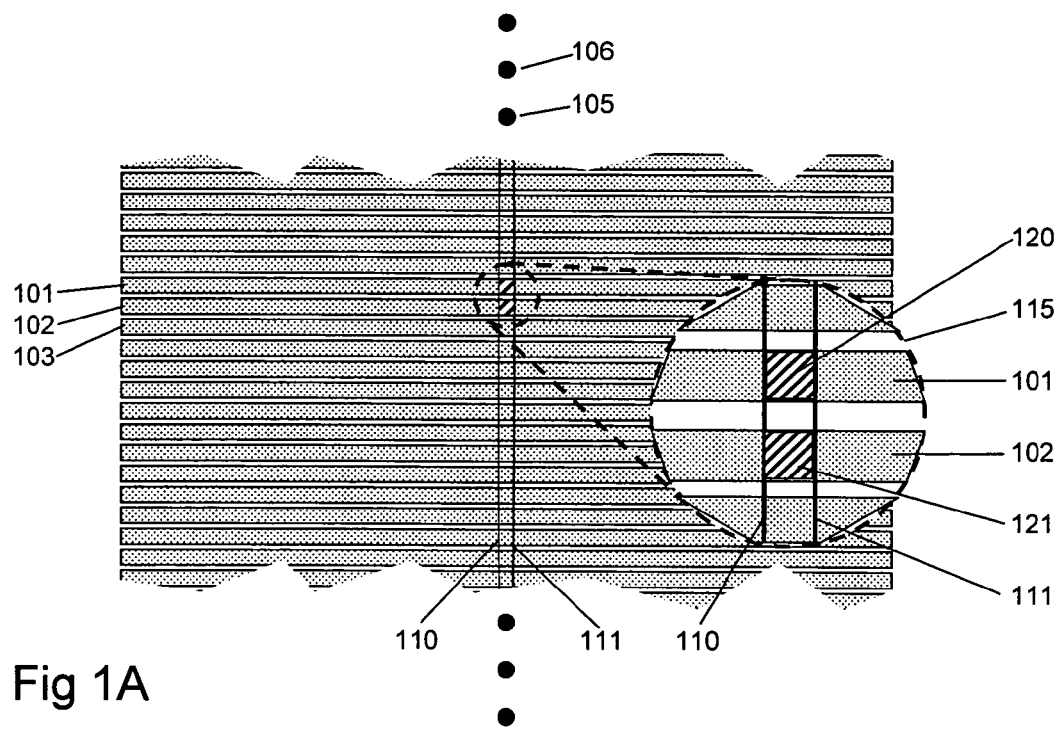
FIGS. 1A & 1B show micromechanical ribbons in a MEMS optical phase shift device.

Polarization light modulators are a new class of MEMS display engines that feature high performance and mechanical simplicity. These modulators incorporate optical components that operate on the polarization and the phase of light to form images for display. Polarization is the basis upon which light is split and recombined in an interferometer while MEMS are used to adjust the phase of the light and ultimately turn pixels on and off.

MEMS optical phase shift devices move only very small distances, and are therefore fast enough to enable a linear array modulator to form a two dimensional image when combined with a scanning mirror. Furthermore, the characteristic size of linear MEMS optical phase device arrays allows them to be optically matched to the characteristic dimensions of high brightness, low divergence light sources. Linear array MEMS optical phase shift devices comprising ribbon (or similar, e.g. cantilever) structures offer the flexibility of modulating light at low intensity before focusing it into an image.

Polarization light modulators incorporate a polarization displacement device (e.g. a Savart plate, or a Wollaston prism combined with a lens) to split light beams into components of orthogonal polarization. These polarization components are made to travel unequal distances in the modulator and are then recombined in the polarization displacement device. When one polarization component is phase shifted with respect to the other, the overall polarization of the recombined beam is transformed. The polarization of the recombined beam is then analyzed by a polarizing beam splitter. Light output from the polarizing beam splitter depends on the polarization state of the incident light beam which in turn depends on the relative phase shift of the polarization components.

A phase shift is imparted to the orthogonal polarization components in the modulator by focusing them on, and causing them to reflect from, a MEMS optical phase shift device. This device has movable regions of slightly different displacement which cause the light beams to travel slightly different distances upon reflection. Many MEMS optical phase shift devices comprise ribbons that modulate the phase of light reflected from their surfaces. However, optical phase shift devices may comprise structures other than ribbons, such as cantilevers.

A display's brightness depends on the ability of its optical elements to withstand high optical intensity and to form light into an image. The capability of an optical element to withstand optical intensity is a function of its efficiency. Light that is neither transmitted nor reflected is absorbed and contributes to heating. When an optical element's capability to dissipate heat is exceeded, it fails. In a MEMS optical phase shift device there is an upper limit to the intensity of light that reflective elements, such as ribbons, can withstand. However, since optical intensity depends on both optical power and the area in which that power is concentrated, overall brightness can be improved by modulating light at low intensity before concentrating it in an image.

An immutable parameter of light sources is étendue which is the product of light emitting area and solid angle into which light is emitted. Étendue is an invariant of optical systems and is related to the brightness achieved. For best efficiency in a display system, the étendue of the light source should be matched to the étendue of the light modulator.

As an approximate but illustrative example consider the étendue and brightness of an arc lamp and a laser. For purposes of example assume that the arc lamp has a light emitting area of one square millimeter ($10^{-2}$ cm$^2$). It radiates light in all directions, i.e. into $4\pi$ steradians, and therefore its étendue is $4\pi \times 10^{-2}$ cm$^2$ (~0.125 cm$^2$). The étendue of a laser emitting a Gaussian beam is equal to the square of the wavelength, or approximately $2.5 \times 10^{-9}$ cm$^2$ for visible light. Because of the vast difference in étendue, the laser need only emit approximately $2 \times 10^{-6}$ W of light to achieve the same brightness as the arc lamp emitting 100 W of light.

The illuminated area of MEMS ribbons in an exemplary MEMS optical phase shift device array is approximately $10^{-4}$ cm$^2$ which is quite a bit less than the étendue of the arc lamp, but quite a bit greater than that of the laser. Therefore the arc lamp is an inefficient light source for the ribbon array. On the other hand, high optical power is needed to deliver acceptable brightness in an image spread out over a large viewing area, as might be needed in a home entertainment system or a movie theater. Low divergence, high power light sources with étendue better matched to MEMS optical phase shift modulators will soon be available. For example, linear arrays of semiconductor lasers are in a period of rapid development and improvement.

Performance gains from matching light sources and modulators can be still further improved by recognizing the possibility of combining linear modulator arrays with anamorphic optics. Light can be modulated in a linear array at low intensity and then refocused to higher intensity for display. A linear array affords a degree of freedom in that light can be modulated in rectangular stripes which are then imaged to square pixels in an image. However, the ability to achieve this sort of enhancement depends on array modulator elements that provide an elongated modulation area.

Contrast is an important display characteristic, for without contrast brightness is wasted. In a polarization light modulator, contrast enhancement is available through both polarization discrimination and the elimination of stray light from imperfect light sources. Polarizers and apertures may be used to increase contrast in a polarization light modulator as described below.

Characteristics of a polarization light modulator suitable as the basis for a high brightness and high contrast display system are now described with reference to the accompanying figures.

Figure 1B:
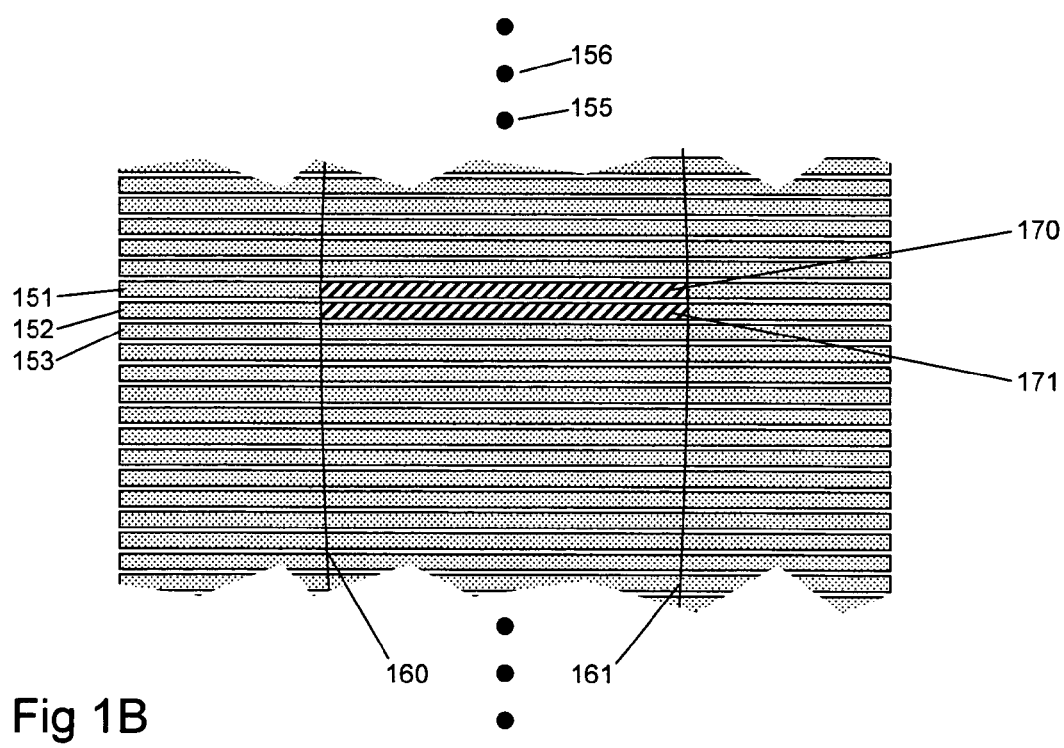

FIGS. 1A & 1B show micromechanical ribbons in a MEMS optical phase shift device. FIG. 1A shows several ribbons (e.g. ribbons 101, 102, 103) in a ribbon array. Dots (e.g. dots 105, 106) indicate that only some of the ribbons in the array are shown. A narrow strip of illumination in the middle of the ribbon array is indicated by lines 110 and 111. The ribbons are illuminated between lines 110 and 111. Inset 115 provides a magnified view of a few ribbons and the area of illumination bounded by lines 110 and 111. For extra emphasis, cross hatched areas 120, 121 show which part of ribbons 101 and 102 are illuminated. The figure is not meant to be to scale and in particular the gap between ribbons is exaggerated. Additional details, such as ribbon supports, are not illustrated.

In a MEMS optical phase shift device ribbons such as those illustrated in FIG. 1A can flex into the plane of the figure. The movement of the ribbons is used to control the phase of light reflecting off them. For example, if ribbons 101 and 102 move relative to one another into the plane of the page, then light reflected from hatched area 120 will accumulate a relative phase shift compared to light reflected from hatched area 121. The phase of light reflected by the ribbons varies by $4\pi D/\lambda$ where D is the displacement of the moving ribbon and $\lambda$ is the wavelength of the light. The phase shift can be analyzed in an interferometer which forms the basis for a light modulator.

In FIG. 1A only a narrow strip of light illuminates the array. Hatched areas 120 and 121 are approximately square areas which may be imaged with spherical optics to form approximately square pixels in an image. Only a small fraction of the ribbon area is illuminated and all optical power reflected by the ribbons is concentrated in the small area.

FIG. 1B is similar to FIG. 1A in that it also shows several ribbons (e.g. ribbons 151, 152, 153) in a ribbon array. Dots (e.g. dots 155, 156) indicate that only some of the ribbons in the array are shown. However, in FIG. 1B a wide strip of illumination in the middle of the ribbon array is indicated by lines 160 and 161. The ribbons are illuminated between lines 160 and 161. For extra emphasis, cross hatched areas 170, 171 show which part of ribbons 151 and 152 are illuminated. The figure is not mean to be to scale and in particular the gap between ribbons is exaggerated. Additional details, such as ribbon supports, are not illustrated.

All other things being equal the light incident upon the ribbons in FIG. 1B is spread over a wider area than that in FIG. 1A. Therefore if a material limitation makes it necessary to restrict the intensity (power per unit area) of light falling on the ribbons then more power can be applied to the ribbons in FIG. 1B compared to those of FIG. 1A. Areas 170, 171 represent an elongated modulation area that can be reshaped into square pixels by anamorphic optics. FIG. 1B represents a design with more power handling capacity and therefore one that can lead to a brighter displayed image than the one in FIG. 1A.

Figure 2A:
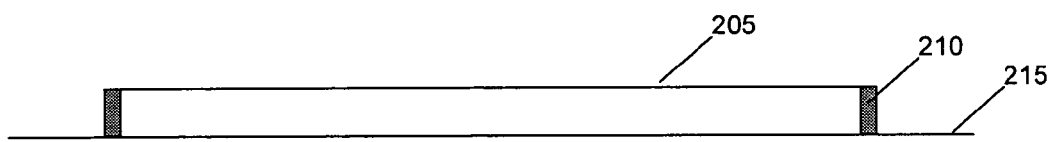
FIGS. 2A & 2B show a micromechanical ribbon in a MEMS optical phase shift device.
Figure 2B:
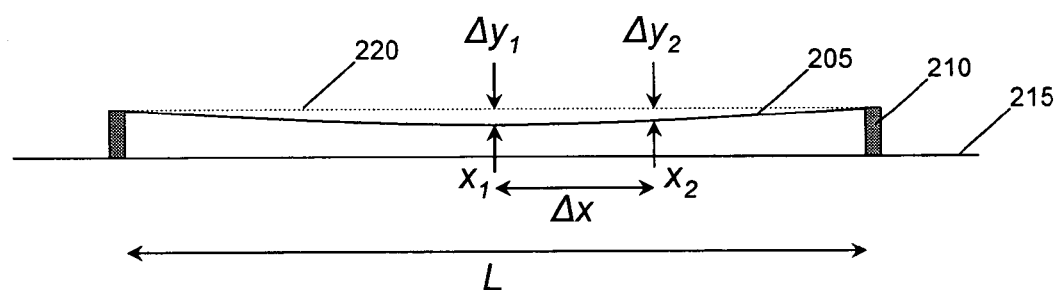

FIGS. 2A & 2B show a micromechanical ribbon in a MEMS optical phase shift device. In FIGS. 2A & 2B the perspective is perpendicular to both the propagation of light striking ribbons in a modulator and also to the long axis of the ribbons; equivalently, the perspective is in the plane of FIGS. 1A & 1B.

In 2A & 2B, ribbon 205 is supported at its ends by supports such as support 210. Support 210 is attached to a base 215. There are numerous ways to fabricate ribbons like ribbon 205 with standard silicon microfabrication processes such as those outlined in U.S. Ser. No. 10/904,766. FIG. 2A shows ribbon 205 in a relaxed state while FIG. 2B shows ribbon 205 in a partially deflected, or flexed, state. Although the drawings are not to scale one may appreciate the size of a typical device by noting that the ribbons are usually about two hundred microns long and they usually flex toward the substrate by less than about one micron.

In FIG. 2B dotted line 220 indicates the position of ribbon 205 in its rest state. It may be seen that in a partially deflected state ribbon 205 moves away from dotted line 220. However, the amount of deflection varies along the length of the ribbon. Clearly the ends of the ribbon do not move, while maximum deflection is achieved farthest away from the supports. The phase shift imparted to light reflecting from a partially deflected ribbon is proportional to the deflection distance. For the ribbon in FIG. 2B, at position $x_1$ the deflection is $\Delta y_1$ while at position $x_2$ the deflection is $\Delta y_2$.

Suppose that a relaxed ribbon as shown in FIG. 2A represents a dark pixel in a corresponding image and a-deflected ribbon as shown in FIG. 2B represents a bright, or fully modulated, pixel. It is instructive to calculate how far, $\Delta x$, away from the center position, $x_1$, of the ribbon will the ribbon contribute as much as, say, 90% of the light that the center portion does. Alternatively, one may ask how wide a section of ribbon contributes to a bright pixel with 90% efficiency.

Light intensity output from a polarization light modulator is proportional to $\sin^2(\Delta y)$. The ribbon deflects toward the base in an approximately parabolic profile. Using these two facts one finds that 90% modulation efficiency is achieved over approximately half the total ribbon length, L, for a typical ribbon. In other words, the strip illumination in FIG. 1B can be as wide as L/2.

FIGS. 1A, 1B, 2A & 2B help show that for best optical power handling a wide strip across the ribbons in a MEMS optical phase shift device ribbon array should be illuminated by a light source. Furthermore the modulation efficiency over half the total ribbon width is quite high. It is now necessary to design anamorphic imaging optics to compress light modulated in elongated areas into square pixels forming a line image suitable for scanning with a scanning mirror.

Figure 3:
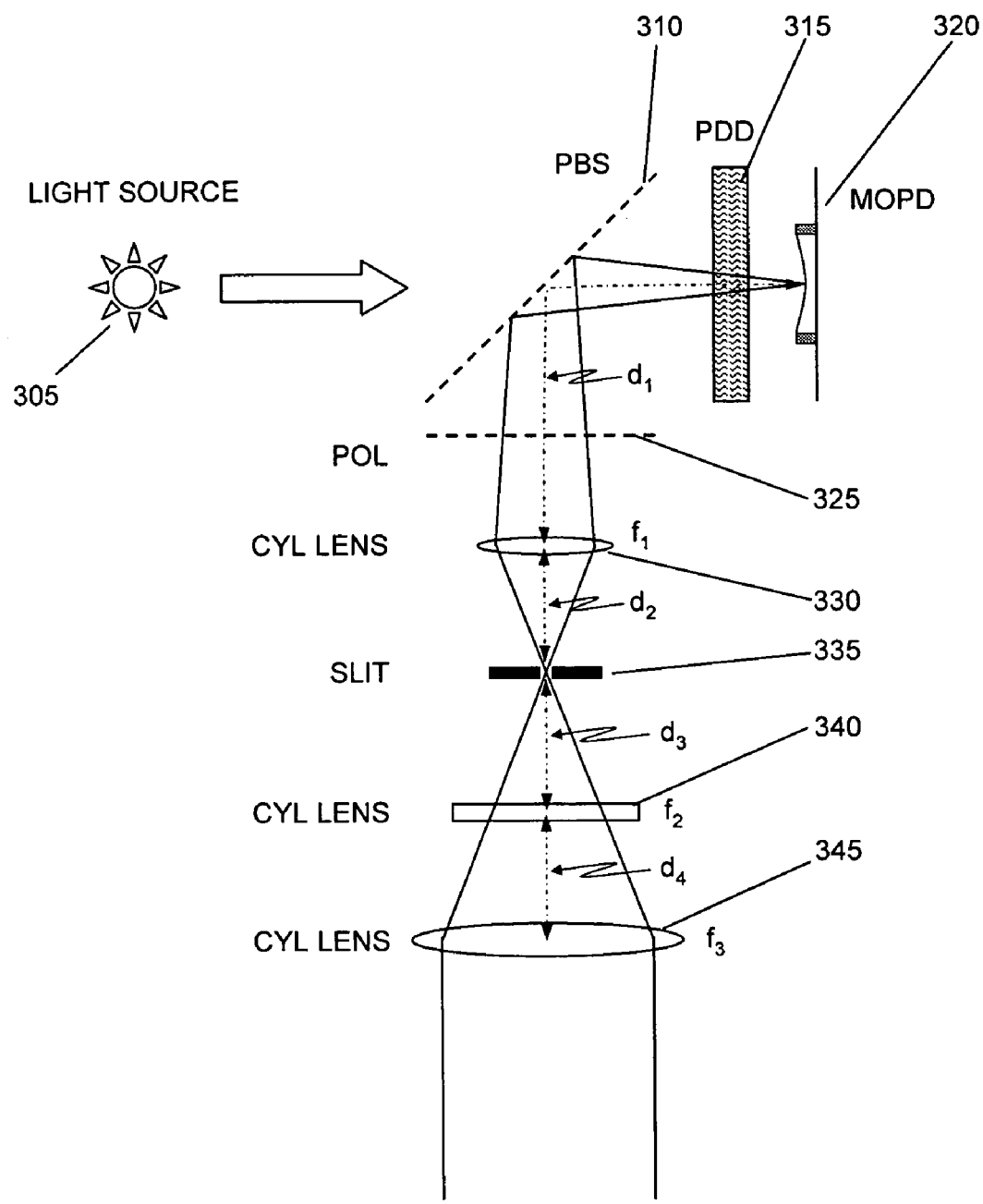
FIG. 3 shows a design for a micromechanical light modulator with anamorphic optics.

FIG. 3 shows a design for a micromechanical light modulator with anamorphic optics. In particular FIG. 3 illustrates an anamorphic optical arrangement for constructing a line image from a polarization light modulator. Also illustrated are optical elements for improving the contrast of images created by the modulator.

In FIG. 3 light source 305 provides light input to a polarization light modulator. Light source 305 may be an arc lamp, laser, array of lasers or any other suitable source of light. Light from light source 305 passes through polarizing beam splitter 310 and polarization displacement device 315 and then illuminates ribbons in MEMS optical phase shift device 320. The ribbons are illuminated in a wide strip as explained in connection with FIG. 1B. Polarizing beam splitter 310 may be of any type; for example, a wire grid polarizer.

Item 315 ("PDD") is a "polarization displacement device" and, as explained in U.S. Ser. Nos. 11/161,452 and 11/336,277, its function is to offset orthogonally polarized components in an incoming light beam into two parallel beams of light. Equivalently, the polarization displacement device combines incoming orthogonally polarized beams of light into a single beam. The polarization of the output light beam depends upon the phase relationship between the polarized components of the incoming polarized beams. Item 320 ("MOPD") is a "MEMS optical phase shift device" and, as explained in U.S. Ser. Nos. 11/161,452 and 11/336,277, its function is to impart an electronically controllable phase shift upon incident light.

Item 325 is a polarizer and may be of any type; for example, a wire grid polarizer. Item 335 is a slit shaped aperture. The long axis of the slit is perpendicular to the plane of FIG. 3. Lenses 330, 340 and 345 are cylinder lenses. Lenses 330 and 345 focus light in the plane of the figure; lens 340, drawn as a rectangle, focuses light perpendicular to the plane of the figure.

Lens 330 demagnifies the illuminated portion of MOPD 320 and images it in the aperture of slit 335. The demagnification factor is given by the ratio $d_1/d_2$ where $d_1$ and $d_2$ are the optical path distance from MOPD 320 to lens 330 and the optical path distance from lens 330 to slit 335 respectively. The focal length, $f_1$, of lens 330 is determined by the lens maker's formula $1/d_1+1/d_2=1/f_1$. Lens 330 effectively compresses the wide illuminated strips (elongated modulation areas) in FIG. 1B into square areas.

The focal length of lens 340 is approximately equal to the optical path distance between it and MOPD 320: $f_2 \approx d_1+d_2+d_3$. Therefore, in the plane perpendicular to the plane of FIG. 3, lens 340 forms an image of MOPD 320 at approximately infinity.

The focal length of lens 345 is approximately equal to the optical path distance between it and slit 335: $f_3 \approx d_3+d_4$. Therefore, in the plane of FIG. 3, lens 340 forms an image of the image appearing in slit 335 at approximately infinity. Said in another way, lenses 330 and 345 form a telescope that (in the plane of FIG. 3) images MOPD 320 at approximately infinity.

When lenses 340 and 345 are set to form an image far away (e.g. at a viewing screen located at approximately infinity) then they may be moved together (keeping distance, $d_4$, approximately constant) to focus the image. The two lenses focus the analyzed light from polarizing beam splitter 310 by different amounts in perpendicular planes.

The available contrast between dark and light states in the polarization light modulators such as those described in U.S. Ser. Nos. 10/904,766, 11/161,452 and 11/336,277 is determined partially by the ability of the polarizing beam splitter to discriminate between polarizations. In an ideal case all light of one polarization is transmitted by the polarizing beam splitter while all light of the orthogonal polarization is reflected. In practice, however, some light in the "wrong" polarization leaks through or is reflected unintentionally.

In FIG. 3 polarizer 325 serves as an additional filter to eliminate unmodulated light output from polarizing beam splitter 310. Polarizer 325 is oriented so as to transmit light of polarization orthogonal to that transmitted by polarizing beam splitter 310. Said another way, polarizer 325 is oriented to transmit light that is reflected by polarizing beam splitter 310. Polarizer 325 is not a required component of the polarization light modulator; it may be used to improve contrast in the system.

System contrast is also affected by stray light. As an example, stray light may appear if the properties of light source 305 are such that it is not possible to focus it in a clean strip as illustrated in FIG. 1B. Optional slit 335, placed at the focus of lens 330, helps eliminate light that was not properly focused at MOPD 320 and thereby helps to improve system contrast.

Figure 4:
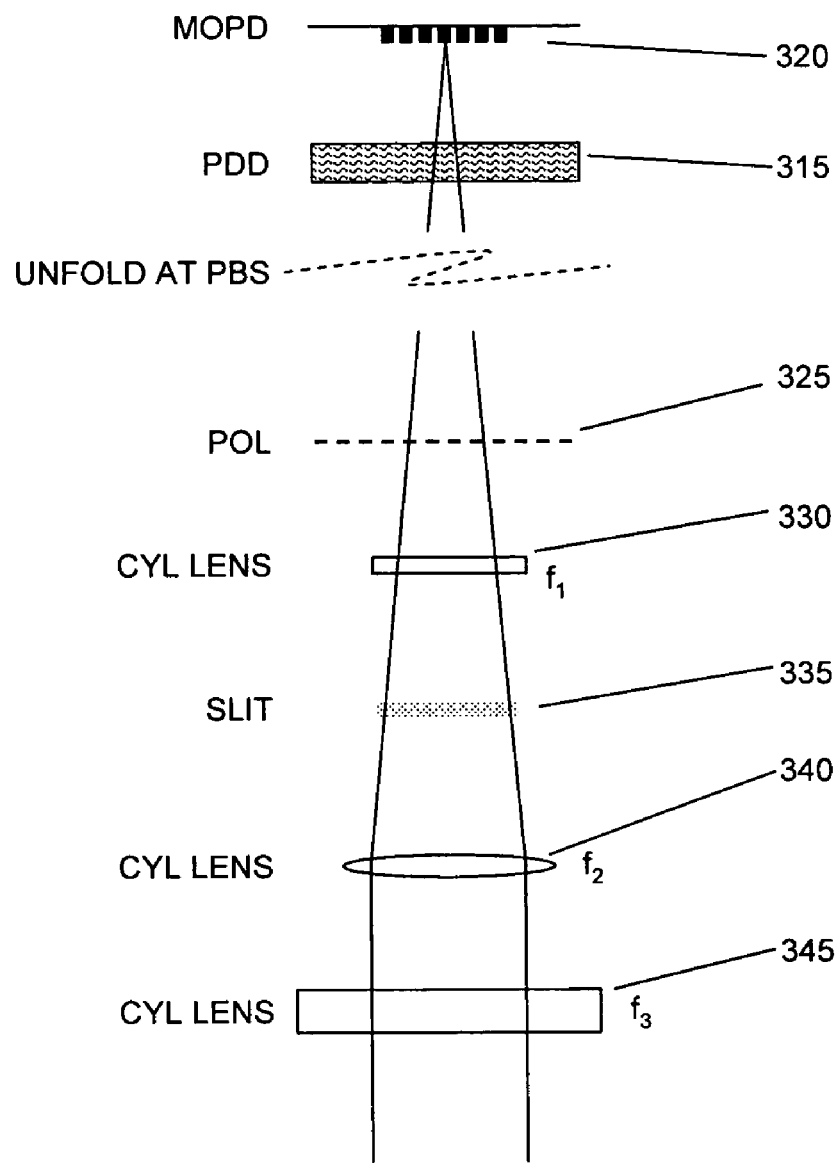
FIG. 4 shows the design of FIG. 3 unfolded at the polarizing beam splitter and viewed in the plane of the page.

FIG. 4 shows the design of FIG. 3 unfolded at the polarizing beam splitter and viewed in the plane of the page. Visualization of the unfolding may be aided by inspection of FIG. 3 and imagining the reflection of PDD 315 and MOPD 320 in PBS 310. Unfolding does not change the optical path distances between any optical elements. In FIG. 4, elements with like numbers as those in FIG. 3 are the same elements, viewed in the plane of FIG. 3.

In FIG. 4, slit 335 is drawn in continuous light shading to indicate that the long axis of the slit aperture is in the plane of FIG. 4. Lenses 330 and 345 are drawn as rectangles in FIG. 4 to indicate that they do not focus light in the plane of the figure. The focal length of lens 340 is approximately equal to the distance between lens 340 and MOPD 320. Therefore a point on MOPD 320 is imaged in the plane of FIG. 4 to approximately infinity by lens 340.

Figure 5:
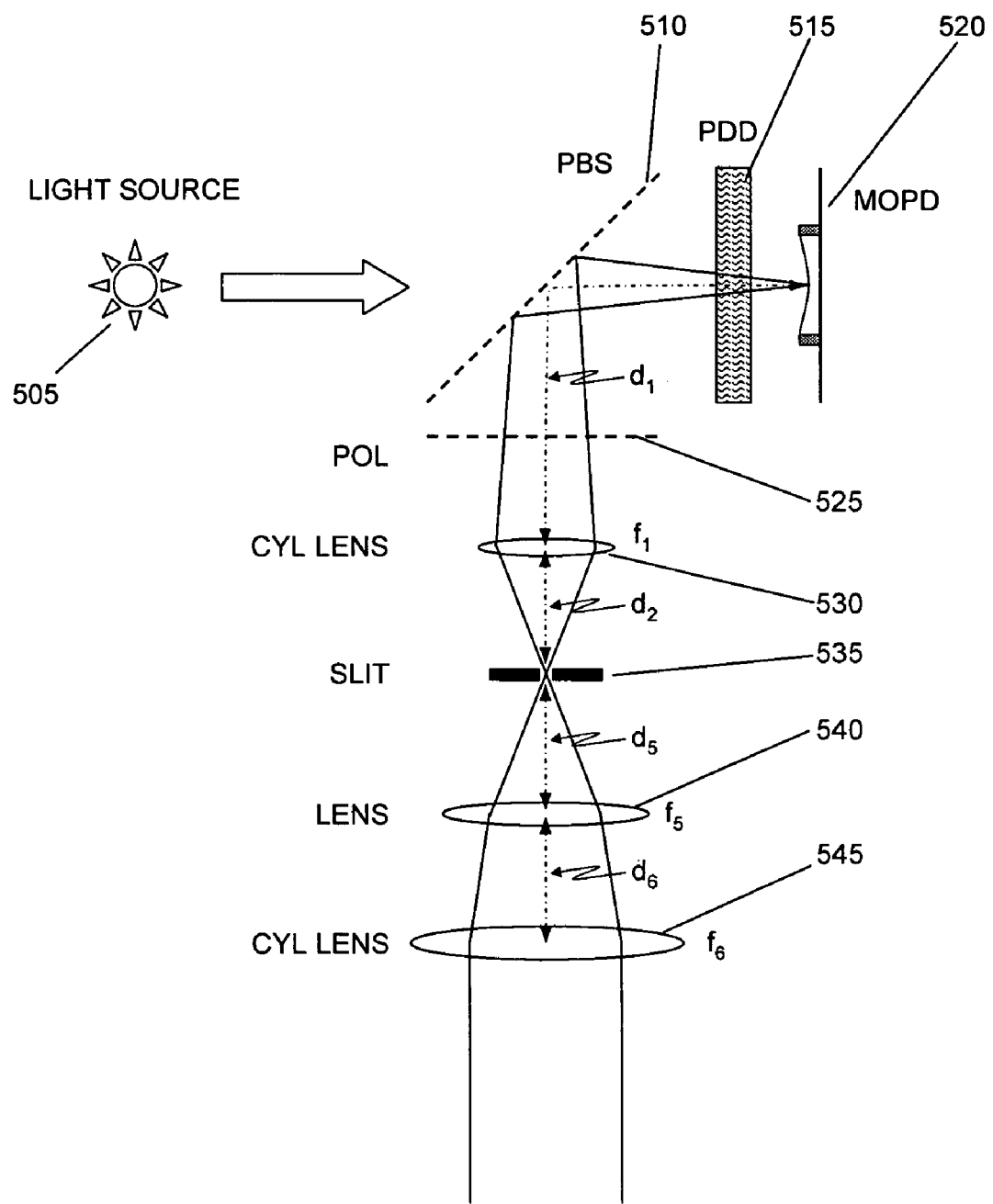
FIG. 5 shows a design for a micromechanical light modulator with anamorphic optics.

FIG. 5 shows a design for a micromechanical light modulator with anamorphic optics. In particular FIG. 5 illustrates an anamorphic optical arrangement for constructing a line image from a polarization light modulator. Also illustrated are optical elements for improving the contrast of images created by the modulator. The design illustrated in FIG. 5 is similar to that shown in FIG. 3; however, in FIG. 5 lens 540 is a spherical lens.

In FIG. 5 light source 505 provides light input to a polarization light modulator. Light source 505 may be an arc lamp, laser, array of lasers or any other suitable source of light. Light from light source 505 passes through polarizing beam splitter 510 and polarization displacement device 515 and then illuminates ribbons in MEMS optical phase shift device 520. The ribbons are illuminated in a wide strip as explained in connection with FIG. 1B. Polarizing beam splitter 510 may be of any type; for example, a wire grid polarizer.

Item 515 ("PDD") is a "polarization displacement device" and, as explained in U.S. Ser. Nos. 11/161,452 and 11/336,277, its function is to offset orthogonally polarized components in an incoming light beam into two parallel beams of light. Equivalently, the polarization displacement device combines incoming orthogonally polarized beams of light into a single beam. The polarization of the output light beam depends upon the phase relationship between the polarized components of the incoming polarized beams. Item 520 ("MOPD") is a "MEMS optical phase shift device" and, as explained in U.S. Ser. Nos. 11/161,452 and 11/336,277, its function is to impart an electronically controllable phase shift upon incident light.

Item 525 is a polarizer and may be of any type; for example, a wire grid polarizer. Item 535 is a slit shaped aperture. The long axis of the slit is perpendicular to the plane of FIG. 5. Lenses 530 and 345 are cylinder lenses. Lenses 530 and 545 focus light in the plane of the figure. Lens 540 is a spherical lens; it focuses light equally in the plane, and perpendicular to the plane, of FIG. 5.

Lens 530 demagnifies the illuminated portion of MOPD 520 and images it in the aperture of slit 535. The demagnification factor is given by the ratio $d_1/d_2$ where $d_1$ and $d_2$ are the optical path distance from MOPD 520 to lens 530 and the optical path distance from lens 530 to slit 535 respectively. The focal length, $f_1$, of lens 530 is determined by the lens maker's formula $1/d_1+1/d_2=1/f_1$. Lens 530 effectively compresses the wide illuminated strips (elongated modulation areas) in FIG. 1B into square areas.

The focal length of lens 540 is approximately equal to the optical path distance between it and MOPD 320: $f_5 \approx d_1+d_2+d_5$. Therefore, in the plane perpendicular to the plane of FIG. 5, lens 540 forms an image of MOPD 320 at approximately infinity. Cylinder lens 545 focuses light in the plane of FIG. 5. Lens 545 is placed a distance, $d_6$, away from lens 540. The relationship between the focal length, $f_6$, of lens 545 and distance $d_6$ is: $f_6 \approx d_6+(f_5 d_5/(f_5-d_5))$. Lenses 540 and 545 focus the analyzed light from polarizing beam splitter 310 by different amounts in perpendicular planes.

Figure 6:
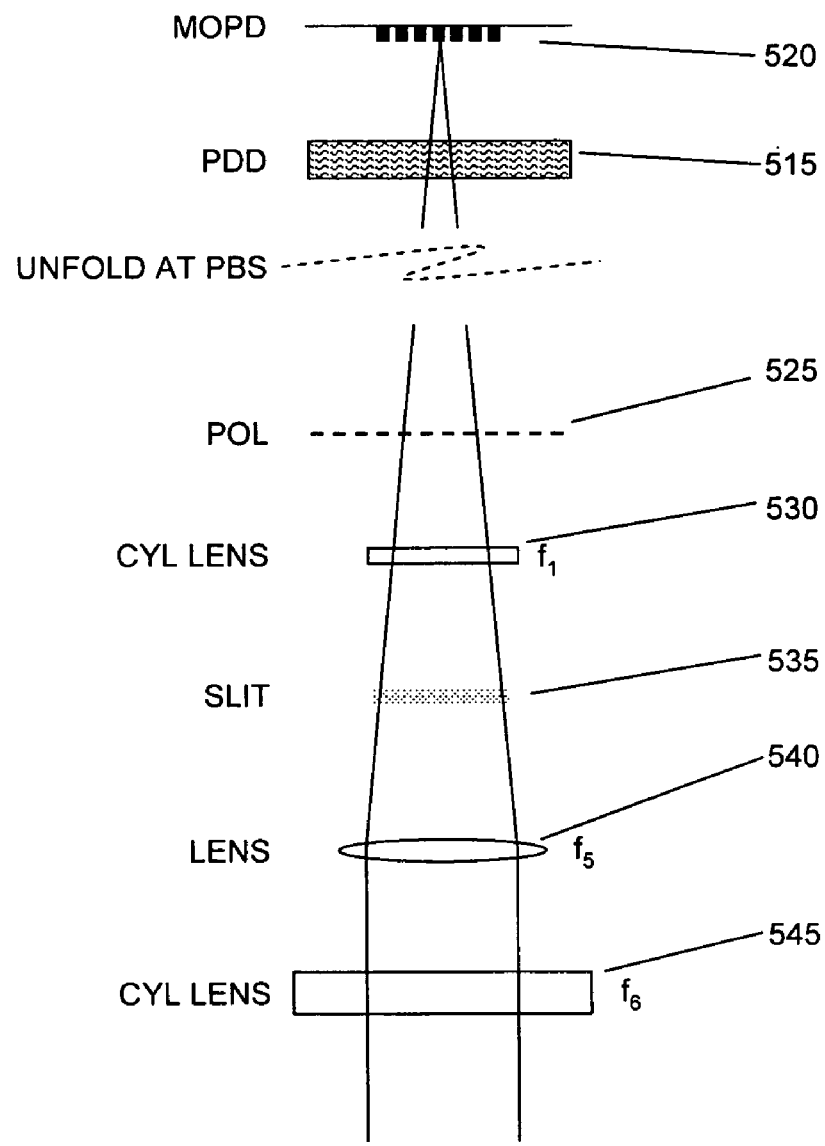
FIG. 6 shows the design of FIG. 5 unfolded at the polarizing beam splitter and viewed in the plane of the page.

FIG. 6 shows the design of FIG. 5 unfolded at the polarizing beam splitter and viewed in the plane of the page. Visualization of the unfolding may be aided by inspection of FIG. 5 and imagining the reflection of PDD 515 and MOPD 520 in PBS 510. Unfolding does not change the optical path distances between any optical elements. In FIG. 6, elements with like numbers as those in FIG. 5 are the same elements, viewed in the plane of FIG. 5.

In FIG. 6, slit 535 is drawn in continuous light shading to indicate that the long axis of the slit aperture is in the plane of FIG. 6. Lenses 530 and 545 are drawn as rectangles in FIG. 6 to indicate that they do not focus light in the plane of the figure. The focal length of lens 540 is approximately equal to the distance between lens 540 and MOPD 520. Therefore a point on MOPD 520 is imaged in the plane of FIG. 6 to approximately infinity by lens 540.

Although, for simplicity, only single-element lenses are illustrated in FIGS. 3-6, clearly multi-element lenses (e.g. achromats) may be used instead. Further, lenses may be replaced with curved mirrors if magnification (or demagnification) is desired in reflection rather than transmission.

Anamorphic lens systems combined with polarization light modulators form an efficient optical engine for high brightness, high contrast displays which have wide ranging utility for the presentation of visual information.

The principles disclosed herein are equally applicable to modulators in which orthogonal polarizations are displaced perpendicular to ribbons or cantilevers in a MEMS optical phase shift device (i.e. light forming a displayed pixel comes from light reflected from more than one ribbon or cantilever), or to modulators in which the direction of polarization displacement is parallel to ribbons or cantilevers in the MEMS optical phase shift device (i.e. light forming a particular pixel comes from light that was reflected from different parts of a single ribbon or cantilever).

Similarly, anamorphic lens systems may be combined with linear array, grating light modulators, thereby improving brightness and contrast in displays based on them. Grating light modulators in linear arrays have a degree of freedom in that light can be modulated in rectangular areas and then refocused into square pixels for display.

Grating light modulators and polarization light modulators are two examples of linear-array, micro-electromechanical optical light modulators that may be combined with anamorphic optical imaging systems that magnify, by different amounts in perpendicular planes, light output from the modulators.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A light modulator comprising:
   a micro-electromechanical optical phase shift device;
   a polarization displacement device that combines phase shifted polarization components of light reflected by the micro-electromechanical optical phase shift device;
   a polarizing beam splitter that analyzes the output of the polarization displacement device; and,
   a system of at least two lenses that focuses, by different amounts in perpendicular planes, analyzed light from the polarizing beam splitter.

2. A modulator as in claim 1 wherein the micro-electromechanical optical phase shift device comprises a linear array of micromechanical ribbons.

3. A modulator as in claim 1 wherein the polarization displacement device comprises a Savart plate.

4. A modulator as in claim 1 wherein the polarizing beam splitter comprises a wire grid polarizer.

5. A modulator as in claim 1 wherein at least one of the at least two lenses is a cylinder lens.

6. A modulator as in claim 1 further comprising a polarizer oriented to transmit the analyzed light.

7. A modulator as in claim 6 wherein the polarizer is a wire grid polarizer.

8. A modulator as in claim 1 further comprising a slit aperture placed at the focus of one of the at least two lenses to remove stray light.

9. An optical display engine comprising:
   a polarization light modulator comprising a linear-array, micro-electromechanical optical phase shift device; and,
   an anamorphic optical imaging system that magnifies, by different amounts in perpendicular planes, light output from the modulator.

10. A display engine as in claim 9 wherein the linear-array, micro-electromechanical optical phase shift device comprises a linear array of micromechanical ribbons.

11. A display engine as in claim 9 further comprising a slit aperture to remove stray light.

12. A display engine as in claim 9 further comprising a polarizer oriented to transmit modulated light from the polarization light modulator.

13. An optical display engine comprising:
    a linear-array, micro-electromechanical optical light modulator; and,
    an anamorphic optical imaging system that magnifies, by different amounts in perpendicular planes, light output from the modulator; wherein,
    the light modulator modulates light at low intensity and the anamorphic optical imaging system refocuses the light to higher intensity for display.

14. A display engine as in claim 13 wherein the linear-array, micro-electromechanical optical light modulator comprises a linear array of micromechanical ribbons.

15. A display engine as in claim 13 wherein the linear-array, micro-electromechanical optical light modulator comprises a grating light modulator.

16. A display engine as in claim 13 further comprising a slit aperture to remove stray light.

* * * * *